June 18, 1946. N. C. CHRISTENSEN 2,402,371
PROCESS FOR RECOVERING ZINC FROM CHLORIDE SOLUTIONS
Filed Oct. 30, 1943
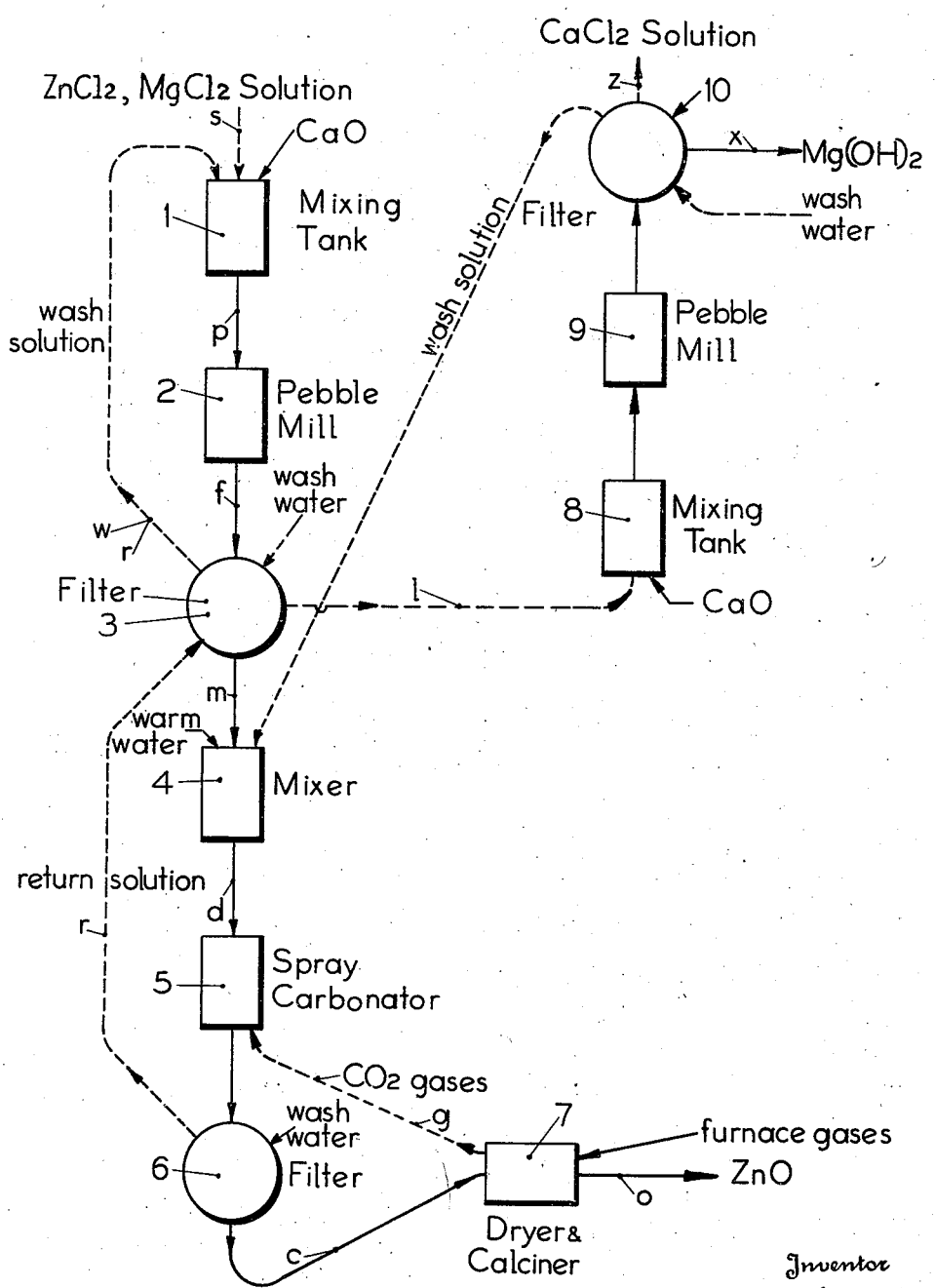
Inventor
Niels C. Christensen Patented June 18, 1946

2,402,371

UNITED STATES PATENT OFFICE 2,402,371

PROCESS FOR RECOVERING ZINC FROM CHLORIDE SOLUTIONS

Niels C. Christensen, Salt Lake City, Utah, assignor to Combined Metals Reduction Company, Salt Lake City, Utah, a corporation of Utah Application October 30, 1943, Serial No. 508,417

7 Claims. (Cl. 23—61)

This invention relates to a process of recovering the zinc from mixed chloride solutions containing $CaCl_2$ and $MgCl_2$ as well as $ZnCl_2$. The process is especially useful and important in processes of leaching complex manganese ores in chloride solutions, in the combined treatment of zinc carbonate and manganese dioxide ores, and may also be used for the recovery of a pure zinc carbonate product from zinc chloride solutions. The invention disclosed herein may advantageously be used in connection with the process of treating zinc carbonate ores forming the subject matter of application Serial No. 518,619, filed January 17, 1944, since issued as Patent 2,363,572, November 28, 1944.

The method of carrying out the process is illustrated in the accompanying flow sheet and is explained in detail in the following description.

In the preparation of the chloride solutions for the recovery of the zinc therefrom as a pure product by this process, it is necessary that metals such as gold, silver, lead, and copper be first removed. This is readily done by treating the solution with zinc dust to precipitate these metals as a mixed product, or by selectively precipitating the gold and silver with copper, the copper with lead and the lead with zinc. (Any cadmium in the solution is also recovered by the treatment with metallic zinc.) To secure a clean zinc precipitate iron and manganese must also be precipitated from the solution. This is preferably done by converting any of the iron not in the ferric state to the ferric condition by treatment with chlorine and thereafter precipitating the iron as ferric hydroxide by treatment of the solution with a carbonate ore of zinc, usually containing $CaCO_3$ and $MgCO_3$, as indicated in the following chemical equations:

$$2FeCl_3+3ZnCO_3+3H_2O=$$
$$3ZnCl_2+2Fe(OH)_3+3CO_2$$
$$2FeCl_3+3CaCO_3+3H_2O=$$
$$3CaCl_2+2Fe(OH)_3+3CO_2$$
$$2FeCl_3+3MgCO_3+3H_2O=$$
$$3MgCl_2+2Fe(OH)_3+3CO_2$$

If only a small amount of manganese is present in the solution, this may be precipitated together with the iron by treatment with chlorine and the zinc carbonate ore as indicated in the following chemical equation:

$$MnCl_2+2ZnCO_3+Cl_2=MnO_2+2ZnCl_2+2CO_2$$

If a large amount of manganese is present in the solution the greater part of the manganese chloride is preferably recovered by selective crystallization, and the small amount of residual manganese is then precipitated as $MnO_2$ as described above.

The purified zinc chloride solution prepared as described above and containing only $ZnCl_2$, $MgCl_2$ and $CaCl_2$ is treated for the recovery of the zinc as described below. The pure mixed chloride solution, diluted with washes from the succeeding filtering and washing operations, is mixed with lime in amount chemically equivalent to the zinc in solution, or preferably slightly in excess of this amount so as to secure complete precipitation of the zinc as a hydroxychloride mixed with $Mg(OH)_2$ as indicated in the following chemical equations:

$$4ZnCl_2+3Ca(OH)_2=2Zn_2(OH)_3Cl+3CaCl_2$$
$$MgCl_2+Ca(OH)_2=Mg(OH)_2+CaCl_2$$

As will be noted, the zinc is not precipitated as a hydroxide but as a hydroxychloride, and a nearly complete precipitation of the zinc may be secured by the use of only three fourths of the chemical equivalent of CaO as indicated in the equation, but to remove the chlorine from the hydroxychloride precipitate and to secure a pure zinc product it is necessary to precipitate an amount of $Mg(OH)_2$ chemically equivalent to the chlorine in the zinc oxychloride precipitate for the subsequent carbonating treatment described below. It will thus be seen that the solution from which the zinc is precipitated must contain magnesium in amount chemically equivalent to one fourth of the zinc in solution (but preferably in slightly greater proportion) in order to secure a suitable mixed precipitate for the subsequent carbonation. (It will be apparent that if lime is used in the precipitation it is converted to $Ca(OH)_2$ and that either lime or hydrated lime may be used, and the terms lime, CaO, and $Ca(OH)_2$ are therefore interchangeable throughout both the specification and claims.)

The mixed zinc hydroxychloride and magnesium hydroxide precipitates are filtered out of the solution and washed, and the washed precipitates are mixed with clean water (preferably warm) and treated with carbon dioxide to convert the zinc to a carbonate and bring the chlorine into solution as $MgCl_2$ as indicated in the following chemical equation:

$$2Zn_2(OH)_3Cl+Mg(OH)_2+4CO_2=$$
$$4ZnCO_3+MgCl_2+4H_2O$$

Any small excess of $Mg(OH)_2$ in the precipitate is removed in solution as a bicarbonate as indicated in the following equation:

$$Mg(OH)_2 + 2CO_2 = Mg(HCO_3)_2$$

For this reason a small excess of CaO may be used in the zinc precipitation without contaminating the final zinc carbonate product with lime or magnesia.

The process as very briefly described above may be carried out as a batch operation but is preferably carried out in a continuous operation as shown in the flow sheet. In order to secure a clean zinc product and to operate the process successfully certain precautions are necessary as set forth in the following more detailed description as illustrated in the flow sheet.

The purified zinc chloride solution $s$ containing the required proportion $MgCl_2$ to $ZnCl_2$ is mixed with the required amount of CaO (or $Ca(OH)_2$) in a suitable preliminary agitator or mixing tank 1. In this step the greater part of the zinc is precipitated but the precipitation is not complete as the precipitate coats the lumps or balls of $Ca(OH)_2$ and prevents complete utilization of the $Ca(OH)_2$ and complete precipitation of the zinc. The pulp mixture $p$ is therefore passed through a pebble mill 2 containing small porcelain marbles or flint pebbles in which the balls or small lumps of mixed precipitate and lime are entirely broken up and the lime completely utilized. The mixture of finished precipitate and solution $f$ is then separated from the solution and washed in a suitable filter 3. The mixed precipitate is a very light product containing a very large amount of combined water and the filter cake cracks badly unless special precautions are taken to avoid or prevent the cracking of the cake in the final stages of the filtration. Unless the cracking is prevented an excessive amount of wash water is used and poor washing occurs. To avoid this cracking due to shrinkage of the cake in the final stages of the filtration a tube type Moore filter has proved efficient, the cake contracting upon the tubes so as to avoid cracking. Though this type of filter has proved efficient and satisfactory, any filter and filtering method which secures efficient washing may be used. The wash solution $w$ from this operation is returned to the head of the precipitation circuit to dilute the incoming purified solution $s$.

The washed filter cake of mixed precipitates $m$ (zinc hydroxychloride and magnesium hydroxide) is mixed with warm water to make a dilute pulp in a suitable mixing and agitating tank 4 to form a relatively dilute suspension and this mixture $d$ is passed through a spray chamber 5 (carbonator) in counter-current to the $CO_2$ gases from the dryer and calciner 7. For this step in the process the rotor spray apparatus described in my U. S. Patents Nos. 1,462,363 and 1,803,792 are preferred, as this type of apparatus gives a very effective mixture of sprayed pulp and gases and a very efficient counter-current flow of pulp and gas with a minimum consumption of power. Other forms of apparatus such as baffle towers may, however, be used if desired. The carbonation of the precipitate (i. e. conversion of the zinc hydroxychloride to zinc carbonate and formation of $MgCl_2$) in contact with the hot $CO_2$ gases from the calciner is rapid and complete. If this step is carried out at temperatures below 20° C., no carbonation takes place however and this step must, therefore, be carried out above this temperature. The zinc carbonate product thus formed is separated from the solution and washed on a suitable filter 6. This product is also a very light product carrying a large amount of combined water, and the filter cake cracks very badly in the final stages of filtration unless a suitable type of filter is used or precautions are taken to prevent the cracking. A tube type Moore filter has been found quite satisfactory for this filtering and washing operation as the filter cake contracts around the tubes and therefore does not crack. The wash $r$ from this step in the process is used to wash the original zinc precipitated on the filter 3 and returned to the head of the precipitation circuit as indicated on the flow sheet.

The zinc carbonate product $c$ from the carbonating operation is dried and calcined to ZnO in the dryer and calciner 7, the carbon dioxide gas $g$ being sent to the carbonator 5 and the zinc oxide $o$ being treated to recover the metallic zinc therefrom or sold as such. Since the decomposition of the zinc carbonate takes place at a relatively low temperature, beginning at 300° C., the calcination may be efficiently carried out in a number of different types of apparatus. If a concentrated $CO_2$ gas is desired this step may be carried out in a muffle type furnace but as a concentrated $CO_2$ gas is not essential to successful and efficient carbonization of the mixed precipitates a direct heat rotary kiln type calciner may be used.

The zinc free solution $l$ from the filter 3 (i. e. from the zinc precipitation) containing the residual $MgCl_2$ from the precipitation may be treated with lime to recover the magnesium coming to the zinc precipitation step in the original solution $s$. Since the Mg precipitated with the zinc is returned to the circuit in the solution $r$ any magnesium coming into the circuit with the original solution (after the first cycle) must be removed as otherwise the magnesium would continue to build up in the solution $l$ which is returned for reuse in the leaching or dissolving steps in which the zinc solution $s$ is produced. This excess Mg may be precipitated as $Mg(OH)_2$ by mixing the solution $l$ with lime (CaO) in the mixer 8 and passing the mixture through a pebble mill 9, as previously described, the $Mg(OH)_2$ $x$ being recovered and washed on a suitable filter 10 and the $CaCl_2$ solution $z$ being returned to the original leaching process in which the zinc is dissolved.

As will be apparent from the foregoing the recovery of the zinc as a clean carbonate depends upon the presence of a sufficient amount of $MgCl_2$ in the solution, i. e. an amount equal to chemical equivalent of one fourth of the zinc in the solution or zinc precipitated. It will also be apparent that the excess of $MgCl_2$ above this amount will not affect the quality of the zinc precipitate since the excess will remain in solution and will merely circulate in the leaching circuit. It will also be seen that the presence of an excess of $MgCl_2$ in solution above the exact chemical equivalent as stated above and the use of a small excess of CaO in the zinc precipitation, will not contaminate the zinc carbonate product, since the excess $Mg(OH)_2$ precipitated in this case will be dissolved in the treatment with $CO_2$ and removed from the $ZnCO_3$. The process may therefore be carried out with an excess of $MgCl_2$ carried in the solution as a circulating load and a slight excess of lime may be used to insure complete precipitation of the zinc without contamination of the zinc carbonate. If the ores treated do not contain magnesium, i. e. if the original solution does not contain sufficient magnesium, this may be added as a magnesium carbonate (or dolomite) mixed with the ore to be leached, or may be added as $MgCl_2$ to the solution, a sufficient amount being added at intervals to maintain the necessary amount of $MgCl_2$ in solution at all times during the continuous operation of the process. An excess of $MgCl_2$ is preferably carried in the solution at all times as a circulating load, so as to insure complete removal of the chlorine from the zinc precipitate in the carbonation step. In most applications of the process of this invention, the solution is used cyclically and in these cases, the precipitation of the zinc may be incomplete without loss of zinc. It will therefore be seen that an amount of CaO, either slightly less or slightly more than that chemically equivalent to the zinc in solution, may be used without loss of zinc or contamination of the final zinc product. These factors allow a very efficient control of the process, since exact control in each cycle is not essential and corrections in the amount of CaO used and in the amount of $MgCl_2$ in solution may be made periodically at intervals of two or more cycles without affecting the purity of the final product.

What is claimed is:

1. The process of recovering zinc from chloride solutions containing $MgCl_2$ in the proportion of one molecular weight, or more, of $MgCl_2$ to four molecular weights of $ZnCl_2$, which consists in treating said solutions with lime substantially in the proportion of one molecular weight of lime to one molecular weight of $ZnCl_2$, so that the zinc is precipitated as zinc hydroxychloride and magnesium is precipitated as magnesium hydroxide in amount substantially chemically equivalent to the chlorine present in the precipitated zinc hydroxychloride, separating said mixed precipitates from the treated solutions, treating said mixed precipitates with $CO_2$ in an aqueous pulp thereby converting the zinc therein to zinc carbonate and recovering the magnesium and chlorine from said precipitates in solution as $MgCl_2$.

2. The process of recovering zinc from chloride solutions containing $MgCl_2$ in the proportion of one molecular weight, or more, of $MgCl_2$ to four molecular weights of $ZnCl_2$, which consists in mixing lime with said solutions substantially in the proportion of one molecular weight of lime to one molecular weight of $ZnCl_2$ and grinding said mixture, so that the zinc is precipitated as zinc hydroxychloride and magnesium is precipitated as magnesium hydroxide in amount substantially chemically equivalent to the chlorine present in the precipitated zinc hydroxychloride, separating said mixed precipitates from the treated solutions, treating said mixed precipitates with $CO_2$ in an aqueous pulp thereby converting the zinc therein to zinc carbonate and recovering the magnesium and chlorine from said precipitates in solution as $MgCl_2$.

3. The process of recovering zinc from chloride solutions containing $MgCl_2$ in the proportion of one molecular weight, or more, of $MgCl_2$ to four molecular weights of $ZnCl_2$, which consists in treating said solutions with lime substantially in the proportion of one molecular weight of lime to one molecular weight of $ZnCl_2$, so that the zinc is precipitated as zinc hydroxychloride and magnesium is precipitated as magnesium hydroxide in amount substantially chemically equivalent to the chlorine present in the precipitated zinc hydroxychloride, separating said mixed precipitates from the treated solutions, treating said mixed precipitates with $CO_2$ in an aqueous pulp thereby converting the zinc therein to zinc carbonate, recovering the magnesium and chlorine from said precipitates in solution as $MgCl_2$, separating said $ZnCO_3$ from said $MgCl_2$ solution, calcining said zinc carbonate to form ZnO and $CO_2$ and using said $CO_2$ in the treatment of more of above said mixed precipitates as described.

4. The process of recovering zinc from chloride solutions containing $MgCl_2$ in the proportion of one molecular weight, or more, of $MgCl_2$ to four molecular weights of $ZnCl_2$, which consists in mixing lime with said solutions substantially in the proportion of one molecular weight of lime to one molecular weight of $ZnCl_2$ and grinding said mixture, so that the zinc is precipitated as zinc hydroxychloride and magnesium is precipitated as magnesium hydroxide in amount substantially chemically equivalent to the chlorine present in the precipitated zinc hydroxychloride, separating said mixed precipitates from the treated solutions, treating said mixed precipitates with $CO_2$ in an aqueous pulp thereby converting the zinc therein to zinc carbonate, recovering the magnesium and chlorine from said precipitates in solution as $MgCl_2$, separating said $ZnCO_3$ from said $MgCl_2$ solution, calcining said $ZnCO_3$ to form ZnO and $CO_2$ and using said $CO_2$ in the treatment of more above said mixed precipitates as described.

5. The process of recovering zinc from chloride solutions containing $MgCl_2$ in the proportion of one molecular weight, or more, of $MgCl_2$ to four molecular weights of $ZnCl_2$, which consists in treating said solutions with lime substantially in the proportion of one molecular weight of lime to one molecular weight of $ZnCl_2$, so that the zinc is precipitated as zinc hydroxychloride and magnesium is precipitated as magnesium hydroxide in amount substantially chemically equivalent to the chlorine present in the precipitated zinc hydroxychloride, separating said mixed precipitates from the treated solutions, treating said mixed precipitates with $CO_2$ in an aqueous pulp thereby converting the zinc therein to zinc carbonate, recovering the magnesium and chlorine from said precipitates in solution as $MgCl_2$, and using said $MgCl_2$ solution for the preparation of more zinc chloride solutions.

6. The process of recovering zinc from chloride solutions containing $MgCl_2$ in the proportion of one molecular weight, or more, of $MgCl_2$ to four molecular weights of $ZnCl_2$, which consists in mixing lime with said solutions substantially in the proportion of one molecular weight of lime to one molecular weight of $ZnCl_2$ and grinding said mixture, so that the zinc is precipitated as zinc hydroxychloride and magnesium is precipitated as magnesium hydroxide in amount substantially chemically equivalent to the chlorine present in the precipitated zinc hydroxychloride, separating said mixed precipitates from the treated solutions, treating said mixed precipitates with $CO_2$ in an aqueous pulp thereby converting the zinc therein to zinc carbonate, recovering the magnesium and chlorine from said precipitates in solution as $MgCl_2$, and using said $MgCl_2$ solution for the preparation of more $ZnCl_2$ solutions.

7. The process of recovering zinc from chloride solutions containing $MgCl_2$ in the proportion of one molecular weight, or more, of $MgCl_2$ to four molecular weights of $ZnCl_2$, which consists in treating the said solutions with lime substantially in the proportion of one molecular weight of lime to one molecular weight of $ZnCl_2$, so that the zinc is precipitated as zinc hydroxychloride and magnesium is precipitated as magnesium hydroxide in amount substantially chemically equivalent to the chlorine present in the precipitated hydroxychloride, separating the mixed precipitate from the treated solution, treating said mixed precipitates with $CO_2$ to convert the zinc to zinc carbonate and recovering the magnesium and chlorine from said mixed precipitates in solution as $MgCl_2$.

NIELS C. CHRISTENSEN.